P. Van Bussum,
Washing Machine,
N° 56,469. Patented July 17, 1866
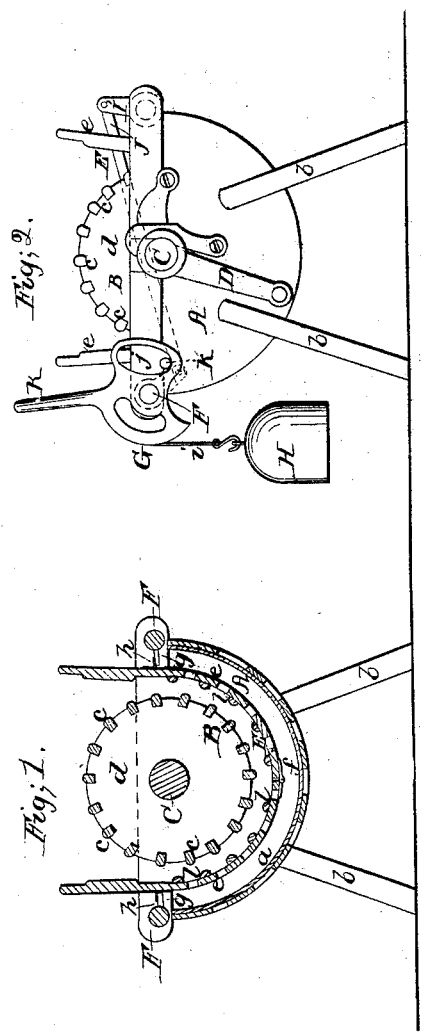
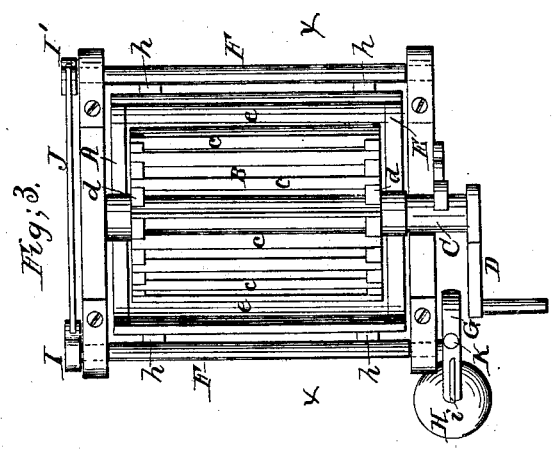
Witnesses;
Inventor;

UNITED STATES PATENT OFFICE.

PHILIP VAN BUSSUM, OF HENDERSON, KENTUCKY.

IMPROVED WASHING-MACHINE.

Specification forming part of Letters Patent No. 56,469, dated July 17, 1866.

*To all whom it may concern:*

Be it known that I, PHILIP VAN BUSSUM, of Henderson, in the county of Henderson and State of Kentucky, have invented a new and Improved Clothes-Washing Machine; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 3; Fig. 2, a side view of the same; Fig. 3, a plan or top view of the same.

Similar letters of reference indicate like parts.

This invention relates to a new and improved clothes-washing machine of that class in which a rotary or reciprocating partially-rotating rubbing-cylinder is employed in connection with an adjustable concave.

The invention consists in a novel construction and arrangement of the concave and the manner of applying the pressure thereto, as hereinafter fully shown and described, whereby it is believed that a very simple and efficient washing-machine is obtained.

A represents the suds-box, of semi-cylindrical form, lined with zinc $a$, and supported at a suitable height by legs $b$.

B is a hollow cylinder, the periphery of which is composed of slats $c$, attached to circular heads $d$, through which a shaft, C, passes centrally, the slats $c$ being parallel with the shaft C. The shaft has its bearings in the sides of the suds-box A, and a crank, D, is attached to one end of the shaft for the convenience of turning it. A sufficient space is allowed between the slats $c$ to admit of the suds passing freely between them.

E represents the concave, formed of two parts, $e\ e$, perforated or formed with slats to admit of the suds passing through them. This concave is fitted within the suds-box underneath the cylinder B, about one-half of the latter being within the suds-box, as shown clearly in Fig. 1.

The two parts $e\ e$ of the concave are connected at their lower ends by hinges or joints $f$, and said parts, near their upper ends, are connected by hinges $g$ to arms $h$, which project from parallel shafts F F, at the upper edges of the suds-box, said shafts being allowed to turn freely in their bearings.

To one end of the shaft F there is attached a segment, G, having a weight, H, connected to it by a cord or chain, $i$, and this segment has an oblong slot or hole, $j$, made in it to receive a pin, $k$, which projects from the end of the suds-box, said pin serving as a stop and preventing the weight H from acting upon the concave beyond a certain degree. (See Fig. 2.) This shaft F, to which, at one end, the segment G is attached, has an arm, I, attached to its opposite end, and the outer end of this arm I is connected by a rod, J, to the outer end of a similar arm, I', on the other shaft F, the two arms I I' having nearly reverse positions. (See Fig. 2.) By thus connecting the two shafts F F they are made to turn simultaneously in opposite directions, and the two parts $e\ e$ of the concave made to work in an equable manner toward and from the slatted cylinder.

The clothes to be washed are operated upon between the slatted cylinder and concave, the clothes being subjected to the requisite degree of pressure by means of the weight H.

The cylinder B is rotated by hand first in one direction and then in the other, and the concave may be slatted or have ribs $l$ attached to its inner surface for the purpose of causing additional friction on the clothes.

The concave, owing to its being made in the parts connected together by hinges, and the two parts connected to the shafts F F, as shown, is made to conform to the cylinder B as it works or yields up and down under the action of the weight H and the action of the clothes upon it, and by throwing the concave entirely up by actuating a lever, K, attached to the segment, the upper ends of the parts $e\ e$ will be spread outward, so as to afford ample room to insert the clothes between the cylinder and concave.

Having thus described my invention, what I claim as new, and desire to secure by Letters Patent, is—

The slatted rotating or semi-rotating cylinder B, in combination with the concave E, formed of the parts $e\ e$, connected by hinges $f$, and attached by hinges $g$ to arms $h$, projecting from shafts F F, and having a weight, H, applied, all arranged substantially in the manner as and for the purpose set forth.

PHILIP VAN BUSSUM.

Witnesses:
F. E. WALKER,
H. S. PARK.